United States Patent [19]
Teeple et al.

[11] Patent Number: 5,518,055
[45] Date of Patent: May 21, 1996

[54] LOW RESISTIVITY TIRE WITH SILICA-RICH TREAD AND AT LEAST ONE ELECTROSTATIC DISCHARGE RING

[75] Inventors: Robert V. Teeple, Fountain Inn; Sid H. Bordelon, Simpsonville; Dean B. Creech, Easley, all of S.C.

[73] Assignee: Michelin Recherche et Technique S.A., Granges-Paccot, Switzerland

[21] Appl. No.: 309,524

[22] Filed: Sep. 20, 1994

[51] Int. Cl.$^6$ .............................. B60C 1/00; B60C 19/08
[52] U.S. Cl. .................... 152/152.1; 152/209 R; 152/525; 152/532; 152/DIG. 2; 361/212; 361/220
[58] Field of Search .................... 152/DIG. 2, 152.1, 152/209 R, 532, 525, 151, 450; 361/212, 220

[56] References Cited

U.S. PATENT DOCUMENTS

| | | | |
|---|---|---|---|
| 1,797,545 | 3/1931 | Churcher | 152/DIG. 2 X |
| 1,945,283 | 1/1934 | Loomis | 152/152.1 X |
| 2,267,503 | 12/1941 | Lytle | 152/DIG. 2 X |
| 2,290,670 | 7/1942 | Bull | 152/DIG. 2 X |
| 2,316,549 | 4/1943 | Benson | 152/152.1 |
| 2,324,589 | 7/1943 | Lytle | 152/DIG. 2 X |
| 2,329,332 | 12/1943 | Bull et al. | |
| 2,339,546 | 1/1944 | Hanson | |
| 2,342,576 | 8/1946 | Fielding | |
| 2,441,945 | 5/1948 | Frolich et al. | 152/152.1 X |
| 2,475,119 | 7/1949 | Reynolds | |
| 2,521,305 | 9/1950 | Olson | 152/DIG. 2 X |
| 2,641,294 | 6/1953 | Bridgefield | 152/151 |
| 2,650,641 | 9/1953 | Hiatt et al. | 152/152.1 X |
| 2,930,426 | 3/1960 | Klang et al. | |
| 3,217,824 | 11/1965 | Jepson | 152/DIG. 2 X |
| 4,519,430 | 5/1985 | Ahmad et al. | |
| 5,066,721 | 11/1991 | Hamada et al. | |
| 5,173,135 | 12/1992 | Tokieda et al. | 152/152.1 |
| 5,227,425 | 7/1993 | Rauline | |

FOREIGN PATENT DOCUMENTS

| | | | |
|---|---|---|---|
| 228177 | 12/1958 | Australia | 152/152.1 |
| 793507 | 1/1936 | France | 152/DIG. 2 |
| 936583 | 7/1948 | France | 152/DIG. 2 |
| 1251273 | 12/1960 | France | 152/DIG. 2 |
| 1251453 | 12/1960 | France | 152/DIG. 2 |
| 1546488 | 10/1968 | France | 152/DIG. 2 |
| 54-102711 | 8/1979 | Japan | 152/DIG. 2 |
| 55-8929 | 1/1980 | Japan | 152/DIG. 2 |
| 55-51606 | 4/1980 | Japan | 152/DIG. 2 |
| 56-112306 | 9/1981 | Japan | 152/DIG. 2 |
| 56-131407 | 10/1981 | Japan | 152/DIG. 2 |
| 57-147903 | 9/1982 | Japan | 152/152.1 |
| 57-194109 | 11/1982 | Japan | 152/152.1 |
| 61-122002 | 6/1986 | Japan | 152/152.1 |
| 61-122003 | 6/1986 | Japan | 152/152.1 |
| 61-143203 | 6/1986 | Japan | 152/152.1 |
| 1-93094 | 4/1989 | Japan | 152/152.1 |
| 1-293208 | 11/1989 | Japan | 152/152.1 |
| 3-42312 | 2/1991 | Japan | 152/152.1 |
| 3-74202 | 3/1991 | Japan | 152/152.1 |
| 554216 | 6/1943 | United Kingdom . | |

OTHER PUBLICATIONS

*Introduction to Materials Science for Engineers*, James Shackelford: Macmillan Publishing Co., New York, 1985, p. 453. translation of French patent 793,507.

Primary Examiner—Adrienne C. Johnstone
Attorney, Agent, or Firm—Robert R. Reed; Russell W. Warnock

[57] ABSTRACT

The tire of this invention has a silica-rich tread compound for excellent rolling resistance and tread wear properties. The tire is made to be conductive such that electrostatic charges on the vehicle can be quickly dissipated when the vehicle stops. An electrostatic discharge ring is located on at least one shoulder portion of the tire and has a relatively low volume resistivity, on the order of 100 megohm centimeter. The discharge ring is positioned to make contact with a conductive sidewall portion of the tire. The overall resistivity of the tire from the rim to the ground surface is made to be less than about 100 megohms.

14 Claims, 3 Drawing Sheets

LOW RESISTIVITY TIRE WITH SILICA-RICH TREAD AND AT LEAST ONE ELECTROSTATIC DISCHARGE RING

BACKGROUND OF THE INVENTION

1. Field of the Invention

This invention is directed to radial pneumatic tires for vehicles and in particular to the conductivity of a tire having a tread with a high silica content.

2. Description of the Art

The electrostatic charge on a vehicle with respect to a zero ground voltage is dissipated by the vehicle's tires being in contact with the ground. This electrostatic charge is produced by the mechanical and electrical components within the vehicle and aerodynamic friction as well as the tire to ground contact during vehicle operation. For example, a rotating shaft within a bearing can result in an electrostatic charge being generated within the vehicle. Objectionable features of the accumulation and discharge of the vehicle's electrostatic charge are well known. Such features include the interference with electronic components grounded to the vehicle (radio static) as well as the annoyance to passengers boarding or standing on the ground and touching the vehicle shortly after it comes to a stop.

The higher the insulating characteristics of the tire the slower the electrostatic voltages are dissipated through the tire. Also, the conductivity of the ground surface is a factor in the rate of electrostatic discharge experienced when the vehicle stops. In general, concrete roadway surfaces dissipate the electrostatic charge much faster than asphalt roadway surfaces. However, driving over a highly conductive metal manhole cover in the roadway will produce a sudden discharge of the electrostatic charge, which is noticable as static in the car radio on the AM frequency. Because rubber is a good insulator, tires are inherently less conductive. Special tire designs are required to continuously discharge the buildup of electrostatic charges during running of the vehicle and, in addition, so that the remaining charge can be quickly dissipated when the vehicle stops.

Tires constructed in the 1940–1970 time period used tread compounds with high volume resistivity values. Electrical charges on these tires as large as 16,000 volts were often recorded. Numerous references show volume resistivity values of the tread rubber as high as 1,000 to 10,000 megohm centimeters. Overall electrical resistivity from the tire rim to the ground surface was disclosed to often exceed 100,000 megohms. Some of the solutions for these resistivity problems of the past are discussed below. Conductivity being the inverse of resistivity, these two terms are both used to characterize a preferred tire having a high conductivity property as well as a low resistivity property.

A simple and effective way to provide a conductive path from the tire rim to the ground through which electrostatic charges can be dissipated is disclosed in U.S. Pat. No. 2,329,332. To decrease the overall electrical resistance from the rim to the ground, a strip or ribbon of a rubber composition compounded to render it electrically conductive is used. This strip is positioned between the carcass and the tread as well as between the carcass and the sidewall. A second strip is also placed circumferentially around the crown portion of the carcass. A chafing strip in the bead area is also disclosed. These strips are not in contact with the ground surface, but are positioned below the tread.

The disclosure of U.S. Pat. No. 2,342,576 shows a number of circumferential layers or strips having high electrical conductivity underlying the tread of the tire. These layers are terminated short of the bead or rim-contacting portions of the tire. The resistivity of the conductive layers is preferably less than 100 ohm centimeter. The tire of this invention is disclosed to eliminate radio static by stopping the flow of electricity by concentrating the charges in these conductive layers.

It has been suggested that electrostatic charges tend to build up on a vehicle's tires as a result of both external and internal friction of the tires. When sufficiently great, the charge results in a spark discharge producing the AM radio interference. In U.S. Pat. Nos. 2,475,199 and 2,930,426 the use of metal wires and cables are incorporated in the construction of the belt package and the carcass of the tire in a manner which prevents unwanted electrostatic charges to accumulate. Electrical current can then be caused to be conducted throughout the tire producing a tire with high conductivity. In this manner the tire uses its reinforcing members to achieve lower resistivity.

To facilitate the dissipation of electrostatic charges, United Kingdom Patent No. 554,216 discloses the treatment of the interior of an inner tube or carcass with a finely-divided non-rubber containing electrically conductive material. The electrically conductive material can be a carbon black or finely divided metallic particles adhering to at least the crown region of the tire. Such a treatment illustrates the use of carbon black as a conductor if sufficient quantities are present in the tire.

As improvements in tire rubber compounding were made the use of tread compounds having highly conductive carbon black components helped solve the initial problems with high resistivity treads of tires. U.S. Pat. No. 2,339,546 discloses that a static electrical charge is often produced on the tire tread because of the friction between the tread and the ground surface. The amount of the charge depends on tire tread design and composition of the tread. Resistivity values for the conventional tread having 30 percent channel black are quoted as being in the order of 1,000 to 10,000 megohm centimeter. However, with an acetylene black to replace the channel black the resistivity values dropped to be only in the order of 10,000 ohm centimeters. This illustrates the historical fact that compounds having highly conductive carbon black components helped solve the high resistivity problems with tires.

The improvements of U.S. Pat. No. 2,339,546 are to overcome the relatively low resistivity of the sidewalls by adding a 1.0 to 2.5 millimeter thick conductive element from a contact point with the rim in the bead portion to extend around or through the tread shoulder and terminate in the face of the tread. The conductive element is made to have a resistivity value of less than 1.0 megohm centimeter. An electrically conductive chafer strip is also used in the bead portion of this tire.

The use of highly conductive sidewall portions in a tire is disclosed in U.S. Pat. No. 5,173,135. The rubber compositions for the purposes of this invention are made to have a volume resistivity not greater than 10,000 ohm centimeter. The purposes for this sidewall rubber is to be resistant to stains and the attraction of mud, dust and dirt pickup during or after running. The carbon black of the sidewall compound includes high abrasion furnace black, fast extrusion furnace black as well as general purpose furnace black.

The problem of high volume resistivity values in tires has again been introduced by the use of high volume resistivity silica-rich compounds in tires. The high silica treads are excellent for low rolling resistance and wear life of the tire.

This makes their use most desirable as a tread compound. In U.S. Pat. Nos. 4,519,430; 5,066,721; and 5,227,425 the improvements in tire performance are disclosed with silica-rich treads. U.S. Pat. No. 5,227,425 discloses the compounds and processes for obtaining a tire having a high performance tread for all seasons. This compound is especially desirable in the tread of the tire. However, the volume resistivity of high silica-rich rubber treads can once again result in a weak link in the ability of the tire to control the electrostatic charge on the vehicle. Therefore, the need to once again provide a high conductivity and low resistivity tire exists. Such a need should be consistent with the continued use of low volume resistivity compounds in other portions of the tire.

SUMMARY OF THE INVENTION

It is, therefore, an object of the present invention to provide a vehicle tire which is inherently capable of timely controlling the magnitude of an electrostatic charge on a vehicle.

Another object of this invention is to provide a tire having a silica-rich tread compound that has an electrical conductivity that keeps electrostatic charges on a vehicle at a relatively low level.

A further object of this invention is to provide a tire having a low resistivity such that any electrostatic charge on a running vehicle can be quickly reduced to an acceptable level when the vehicle stops.

Yet another object of this invention is to provide a tire which will continue to dissipate electrostatic charges on the vehicle to the ground surface during the life of the tire when the tread becomes worn.

These objects are met by a radial pneumatic tire with a silica-rich tread which is also capable of timely discharging the static electricity accumulated in the vehicle on which the tire is mounted. The tire comprises a toroidal carcass terminating at opposite bead regions of the tire which are adjacent a rim of the vehicle when the tire is mounted on the rim, a belt package radially outward of a crown portion of the carcass, and a belt edge rubber portion at each lateral edge of the belt package. A pair of spaced apart sidewall rubber portions are each positioned axially outside a respective lateral portion of the carcass and extend radially inward from a respective belt edge to contact the rim when the tire is mounted on the rim. A tread portion of the tire, having at least 50 percent silica content by weight, is positioned radially outward of said belt package for contacting a ground surface over a contact patch having a tread width and supporting the tire of the vehicle. At least one electrostatic discharge ring is positioned at a lateral edge of the tread and has a first edge axially inward of a lateral edge of the tread width at a surface of the tread and a second edge radially inward of said tread portion. The at least one discharge ring provides a conductive path from the ground surface to a combination of a conductive belt edge rubber portion and a conductive sidewall rubber portion when the tire is in service.

The objects of this invention are further met by the at least one electrostatic discharge ring having a relatively constant thickness value and being formed into lateral grooves of the tread. The at least one discharge ring as well as the conductive sidewall rubber portion and the conductive belt edge rubber portion have relatively low rubber volume resistivity values. The physical limits of the at least one discharge ring are such that the tire freely conducts electrical charges from the rim to the supporting ground surface when the tire is in service.

BRIEF DESCRIPTION OF THE DRAWINGS

Further features of the present invention will become apparent to those skilled in the art to which the present invention relates from reading the following specification with reference to the accompanying drawings, in which.

DETAILED DESCRIPTION OF THE PREFERRED EMBODIMENTS

The tire of this invention has an electrostatic discharge ring located at one or both lateral edges of the tread to provide a low resistivity path for discharging to ground the static electricity accumulated by a vehicle during running. The discharge ring displaces a portion of the tread rubber at the surface and is within the lateral grooves of the tread pattern within the contact area having a tread width. A minimum area of the discharge ring remains at the surface of the tread in the contact area during the life of the tire as it becomes worn.

Figure 1:
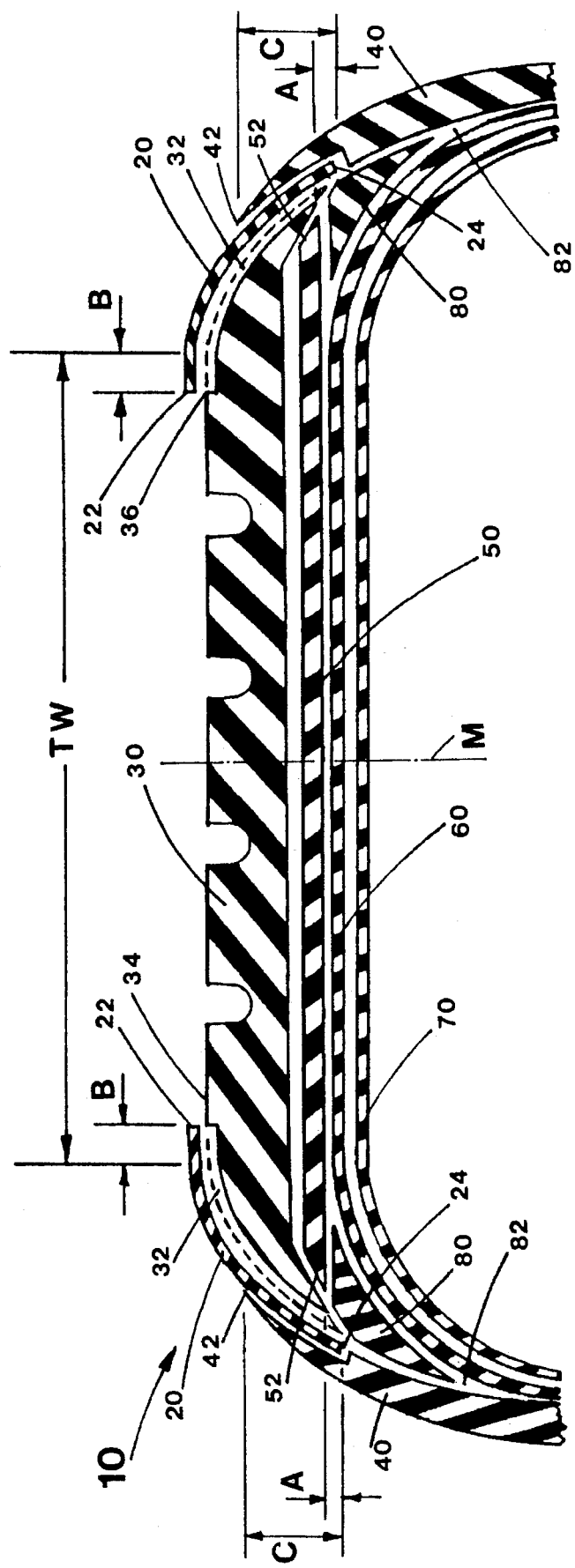
FIG. 1 is a blown-up cross sectional view of the crown portion of the tire of this invention.

The cross-section of FIG. 1 illustrates the various components of the tire 10 of this invention in the crown portion of the tire. Components have been separated in this illustration to better identify their respective limits. The radial pneumatic tire of this invention has a silica-rich tread compound where the filler material in the tread 30 has at least a 50 percent silica content by filler weight. The total filler content of the tread portion, being approximately 35 percent by weight of the total tire, is usually made of a high percentage of carbon black as standard in the industry. Recent advances in the use of silica fillers has changed this percentage in many tire applications. Tires with as high as 90 percent silica content for the tread filler are now possible with excellent wear resistance. The problem with silica-rich treads is their high electrical resistivity. This allows a high electrostatic charge to accumulate on the running vehicle. Volume resistivity values as high as $2 \times 10^{14}$ ohm centimeters have been observed for some silica-rich tread compounds. Volume resistivity measurements for rubber are standard in the industry. The "American National Standards Institute" standard D257 is an example, and is herein incorporated by reference. Overall resistivity values for the tire from the rim to the ground surface have been observed as high as $1 \times 10^{11}$ with tires having silica-rich treads. One method to measure the overall resistivity value of tires is discussed in this disclosure.

The tire 10 having a silica-rich tread 30 has a standard construction except for the addition of an electrostatic discharge ring 20, as illustrated in FIG. 1. A toroidal carcass 60 terminates at opposite bead regions of the tire adjacent to a rim (not shown) of the vehicle. The carcass has at least one carcass ply within the scope of this invention. A belt package 50 is radially outward of a crown portion of the carcass 60 and has a plurality of belt plies. A belt edge rubber portion 80 exists at each belt edge 52 of the belt package 50 to help transition the forces at the belt edge and to better provide physical geometric changes in the shoulder areas. A pair of spaced apart sidewall rubber portions 40 are positioned axially outside the lateral portions of the carcass, and each sidewall portion extends radially inward from a respective belt edge 52 to the rim (not shown). Each sidewall is axially outside a tread edge 32 and extends radially outward to an end point 42. The innerliner 70 helps maintains air in the tire during running.

An essential component of this invention is the critically positioned electrostatic discharge ring 20. The discharge ring provides a low resistance component between the ground surface and at least one of the sidewall rubber portions 40. The tread portion 30 contacts the ground surface at its outer surface 34 over a tread width TW, as shown in FIG. 1. The discharge ring 20 has its outer surface flush with the outer surface 34 of the tread portion 30. Two discharge rings are shown in FIG. 1, however, one discharge ring may be sufficient. The discharge ring 20 is positioned to be axially inward of the sidewall rubber portion 40. A first edge 22 of the discharge ring is located axially inward of a lateral edge of the tread width TW a distance B. The distance B must be sufficient to make electrical contact with the ground surface. The preferred distance is 7 percent of the tread width TW when the tire is new and when the tire is at normal vehicle operating conditions of load and pressure in accordance with the standards of "The Tire and Rim Association Inc." (T&RA) of Coply, Ohio 1994 yearbook; herein included by reference. Alternately, the tread width can be that corresponding to 65% of maximum load for a given pressure in accordance with T&RA. A second edge 24 of the discharge ring 20 is positioned radially inward of the tread portion 30 a distance A of at least 3 millimeters. Alternately, the discharge ring should overlap the sidewall rubber portion by at least 20 millimeters. The inward radial extent of the second edge 24 must be such that both of these conditions are satisfied. Contact must be made with at least a respective sidewall rubber portion having a volume restivity of not more than about 100 megohm centimeter. Changes in the tire structure can be accommodated by changes in the length of this discharge ring 20 within the scope of this invention.

The thickness of the discharge ring has a value in the range of about 0.20 millimeter to about 1.0 millimeter. The preferred thickness is 0.50 millimeter. The required thickness is consistent with the predetermined overall resistivity value of the tire from the rim to the ground surface. Volume resistivity values are in the range of about 10 megohm centimeter to about 100 megohm centimeter for the discharge ring 20 of this invention. The preferred value is 10 megohm centimeter. For the purpose of this discussion the tire is said to be "conductive" with these volume restivity values which are values significantly less than typical volume restivity values in a tire having a silica-rich tread component. Other thickness values and volume resistivity values are also possible to achieve the object of this invention. However, the preferred values result in a more efficient system to manufacture. The use of a thick discharge ring 20 on one side of the tire can produce uniformity problems. The dashed line at a lateral edge 32 of the tread portion 30 in FIG. 1 indicates a portion of the tread being removed to provide space for the discharge ring 20. This is a desirable feature with only one discharge ring being used with the tire.

Figure 2:
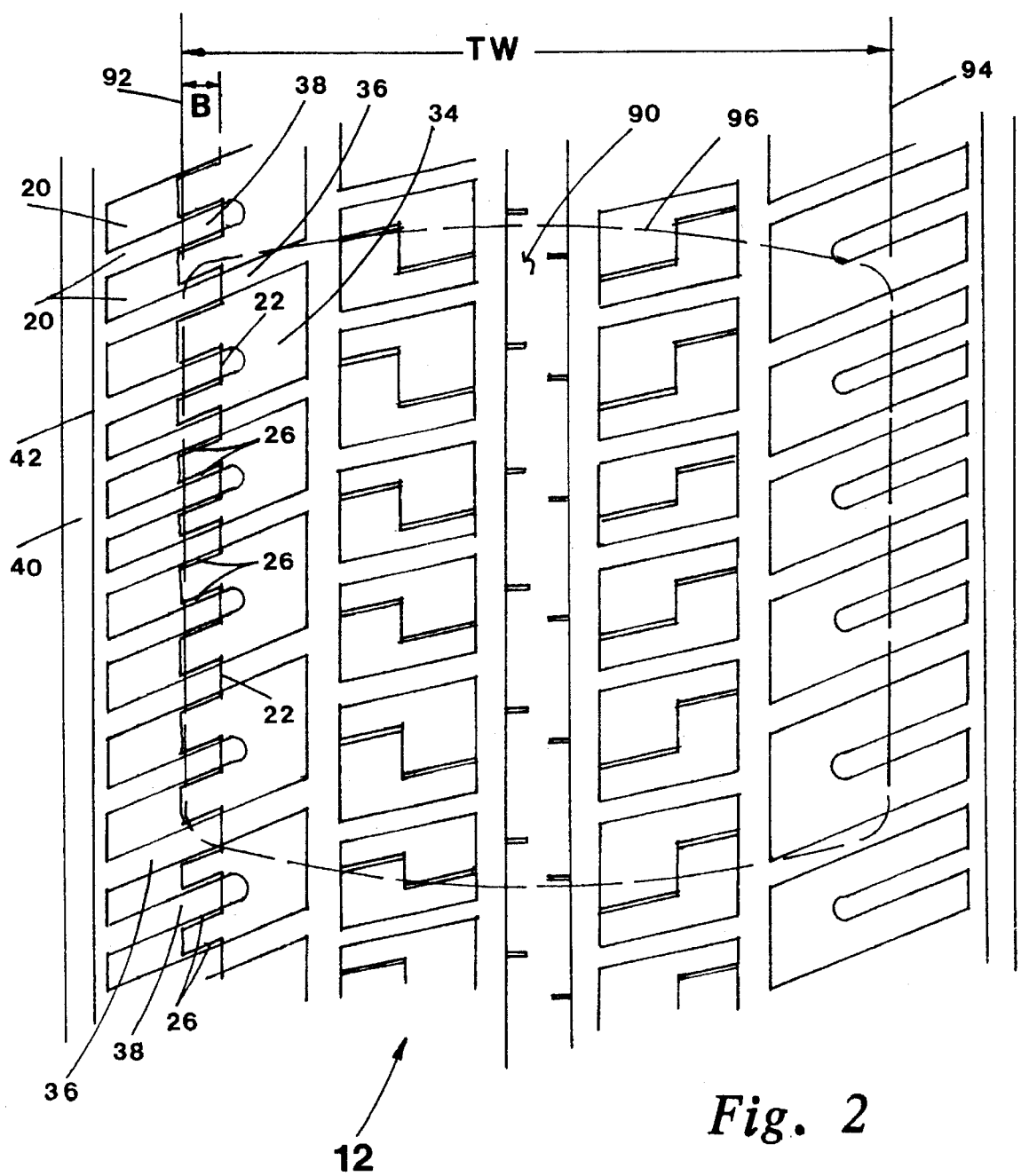
FIG. 2 is a plan view of a tire tread at a contact patch showing the extent of a discharge ring of this invention at one lateral edge of the tread.

Another essential embodiment of this invention is to provide a discharge ring 20 that is effective when the tire 10 becomes worn. The discharge ring 20 of this invention is formed into the lateral grooves of the tread pattern at the lateral edges of the tread width during the curing operation for making the tire. The tire 10 contacts a ground surface over a contact patch 90 on the tread pattern as illustrated in the plan view of the tread of FIG. 2. The tread pattern illustrated is an example of a typical pattern showing the boundary 96 of the contact patch 90 having lateral edges 92 and 94 that form the tread width TW. A discharge ring 20 is shown only on the left side of the tread pattern associated with lateral edge 92. The discharge ring has a first edge 22 which extends a distance B from the lateral edge 92 and remains in the lateral grooves 36,38 of this worn tire. This illustration shows the discharge ring 20 to only remain at the fore and aft edges of the lateral grooves 36,38. The discharge ring has become removed by wear between lateral grooves due to ground contact.

Narrow edges 26 of the discharge ring remain at the level of the surface 34 of the tread pattern. These narrow edges 26 provide electrical contact between the ground surface and the sidewall rubber portion 40. The area of the discharge ring 20 located at the surface of the tread of the worn tire has a value in the range of about 10 square millimeters to about 20 square millimeters. The preferred area of the discharge ring 20 at the surface 34 of the tread 30 of a worn tire 12 is at least 15 square millimeters during the life of the tire. The tire can also have a second discharge ring on the right side of the tread, and the same surface area requirements apply for the second discharge ring.

The object of this invention is to have a low tire resistance value for quickly discharging the electrostatic charges on the vehicle. This is established by defining overall resistance values from the rim to the ground surface. The conductive sidewall rubber portion as well as the conductive belt edge rubber portion preferably have a rubber volume restivity of not more than about 100 megohm centimeter. A functional relationship for the decay of an initial voltage Vo to another lower voltage Vt at time t is given by:

$$V_t = V_o \times e^{-t/RC}$$

where R is the resistivity of the tire and C is the capitance of the tire/vehicle system. The resistivity can be changed by orders of magnitude to allow a major change in the time constant 1/RC of the relationship. The larger the time constant (low R value) the faster the voltage decays from an initial value Vo to an acceptable value Vt for the tire. The preferred resistivity values are disclosed in this invention.

Figure 3:
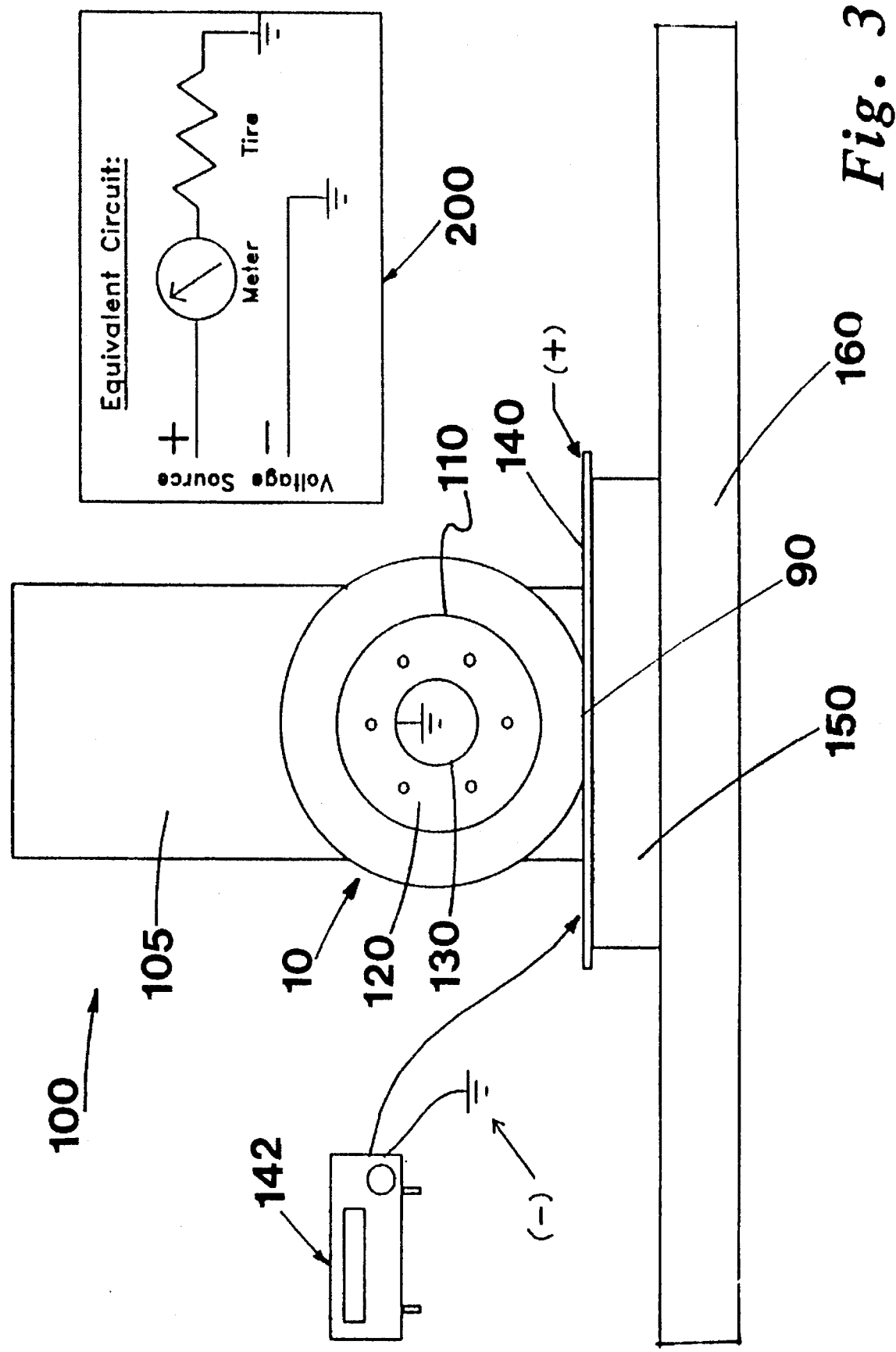
FIG. 3 is an diagram of a test apparatus to measure the overall resistivity of a tire including an equivalent circuit diagram.

The apparatus 100 of FIG. 3 is used to measure the overall resistivity of the tire in this invention. A loading device 105 is used to load the tire 10 and provide a contact area 90 on a brass plate 140. The brass plate 140 is supported by an insulating material 150 placed on machine table 160. The rim 120 is supported by the spindle 130 which is grounded. The tire to rim innerface 110 is made conductive and a voltage is placed on the brass plate 140. The voltage source 142 provides an electrical potential difference between the rim and the ground surface (brass plate). The equivalent circuit diagram 200 shows how the tire resistance is measured by a meter. Overall resistivity values of the tire 10 of this invention, as measured by the apparatus 100 from the rim to the ground surface, are not greater than about 100 megohms.

From the above description of the preferred embodiments of the invention, those skilled in the art will perceive improvements, changes and modifications. Such improvements, changes and modifications within the skill of the art are intended to be covered by the appended claims.

Having described the embodiments of this invention in sufficient detail for those in the art, what is claimed is:

1. A radial pneumatic tire with a silica-rich tread which is capable of timely discharging the static electricity accumulated in a vehicle on which the tire is mounted, comprising:

a toroidal carcass terminating at opposite bead regions of the tire which are adjacent a rim of the vehicle when the tire is mounted on the rim;

a belt package radially outward of a crown portion of the carcass, and a belt edge rubber portion at each lateral edge of said belt package;

a pair of spaced apart sidewall rubber portions each positioned axially outside a respective lateral portion of said carcass and extending radially inward from a respective belt edge to contact said rim when the tire is mounted on the rim;

a tread portion, having at least a 50 percent silica content by weight, positioned radially outward of said belt package for contacting a ground surface over a contact patch having a tread width and supporting said tire of the vehicle; and at least one electrostatic discharge ring positioned at a lateral edge of said tread and axially inward of a respective sidewall portion and having a first edge located axially inward of a lateral edge of the tread width at a surface of the tread and a second edge located radially inward of said tread portion, wherein said at least one discharge ring provides a conductive path from the ground surface to a combination of a conductive belt edge rubber portion and a conductive sidewall rubber portion when the tire is in service.

2. The tire set forth in claim 1, wherein said at least one electrostatic discharge ring has a relatively constant thickness value in the range of about 0.2 millimeter to about 1.0 millimeter, said at least one discharge ring being formed into lateral grooves in said tread during the curing operation.

3. The tire set forth in claim 1, wherein the electrostatic discharge ring has a rubber volume resistivity value in a range of about 10 megohm centimeter to about 100 megohm centimeter.

4. The tire set forth in claim 1 wherein the conductive sidewall rubber portion as well as the conductive belt edge rubber portion have a rubber volume resistivity value of not more than about 100 megohm centimeter.

5. The tire set forth in claim 2, wherein a first distance that the first edge of said at least one discharge ring extends axially inward from the lateral edge of the tread width is at least 7 percent of the tread width at normal vehicle operating conditions of load and pressure when said tire is new.

6. The tire set forth in claim 5, wherein the first distance the first edge of said at least one discharge ring extends radially inward from the lateral edge of the tread width is such that each discharge ring over the contact patch having the tread width has at least 15 square millimeters of area at a surface of the tread during the life of the tread.

7. The tire set forth in claim 1, wherein a second distance the second edge of said at least one discharge ring extends radially inward is a distance from the tread of at least 3 millimeters and a distance from the radially outer edge of the conductive sidewall rubber portion of at least 20 millimeters.

8. The tire set forth in claim 1, wherein there are two electrostatic discharge rings each positioned at a respective lateral edge of said tread and having a relative constant thickness value in the range of about 0.2 millimeter to about 1.0 millimeter, said discharge rings being formed into lateral grooves of the tread during the tire's curing operation.

9. The tire set forth in claim 8, wherein the electrostatic discharge rings each have a rubber volume resistivity value in a range of about 10 megohm centimeter to about 100 megohm centimeter.

10. The tire set forth in claim 9, wherein a first distance the first edge of each discharge ring extends axially inward of a respective lateral edge of the tread width is at least 7 percent of the tread width at normal vehicle operating conditions of load and pressure when the tire is new.

11. The tire set forth in claim 10, wherein the first distance the first edge of each discharge ring extends axially inward of a respective lateral edge of the tread width is such that each discharge ring over the contact patch having the tread width has at least 15 square millimeters of area at a surface of the tread during the life of the tread.

12. The tire set forth in claim 9, wherein a second distance the second edge of each discharge ring extends radially inward is a distance from the tread of at least 3 millimeters and a distance from the radially outer edge of the respective conductive sidewall rubber portion of at least 20 millimeters, the respective conductive sidewall rubber portion having a volume resistivity of not more than about 100 megohm centimeter.

13. The tire set forth in claim 1, wherein the overall resistance of the tire from the rim to the ground surface when the tire is in service is not greater than about 100 megohms.

14. The tire set forth in claim 8, wherein the overall resistance of the tire from the rim to the ground surface when the tire is in service is not greater than about 100 megohms.

* * * * *